(12) United States Patent
Leung et al.

(10) Patent No.: US 9,580,041 B1
(45) Date of Patent: Feb. 28, 2017

(54) VEHICLE PET HARNESS

(71) Applicant: Launch Lab, Inc., Pasadena, CA (US)

(72) Inventors: Michael Leung, Pomona, CA (US); Bin Lee, Pomona, CA (US); Gregory Mote, Glendora, CA (US); Alexandra Johnson, Los Angeles, CA (US)

(73) Assignee: Launchlab, Inc., Pasadena, CA (US)

( * ) Notice: Subject to any disclaimer, the term of this patent is extended or adjusted under 35 U.S.C. 154(b) by 58 days.

(21) Appl. No.: 14/301,279

(22) Filed: Jun. 10, 2014

Related U.S. Application Data

(63) Continuation-in-part of application No. 13/918,902, filed on Jun. 15, 2013, now Pat. No. 9,139,157.

(51) Int. Cl.
  *A01K 27/00* (2006.01)
  *B60R 22/10* (2006.01)

(52) U.S. Cl.
  CPC ............ *B60R 22/10* (2013.01); *A01K 27/002* (2013.01)

(58) Field of Classification Search
  CPC .. A01K 27/002; A01K 1/0263; A01K 1/0272; A01K 1/0281; B60R 22/10; B60R 22/14; B60R 2022/006; B60R 22/105; B60R 7/043; B62J 2099/0073
  USPC ....... 119/771, 769, 792, 793, 712, 788, 907; 280/801.1
  See application file for complete search history.

(56) References Cited

U.S. PATENT DOCUMENTS

| | | | | |
|---|---|---|---|---|
| 3,310,034 A | * | 3/1967 | Dishart | B60R 22/10 119/771 |
| 3,321,247 A | * | 5/1967 | Dillender | A47D 15/006 182/3 |
| 3,948,222 A | * | 4/1976 | Longshore | A01K 1/04 119/771 |
| 4,324,204 A | * | 4/1982 | Friedman | A01K 1/04 119/771 |
| 4,715,618 A | * | 12/1987 | Harris | B60R 22/10 119/771 |
| 4,817,562 A | * | 4/1989 | Giroux | A01K 1/0263 119/771 |
| 5,167,203 A | * | 12/1992 | Scott | A01K 1/0263 119/771 |
| 5,305,710 A | * | 4/1994 | Ward, Jr. | A01K 1/0263 119/756 |
| 5,443,037 A | * | 8/1995 | Saleme | A01K 27/002 119/771 |
| 5,529,018 A | * | 6/1996 | Butts | A01K 1/0272 119/792 |
| 5,611,298 A | * | 3/1997 | Sporn | A01K 27/002 119/792 |
| 5,713,308 A | * | 2/1998 | Holt, Jr. | A01K 27/002 119/792 |
| 5,913,285 A | * | 6/1999 | Pritchard | A01K 27/002 119/769 |

(Continued)

*Primary Examiner* — Yvonne Abbott-Lewis
(74) *Attorney, Agent, or Firm* — David J. Wilson

(57) ABSTRACT

The present invention is an improved safety harness for animals riding in a motor vehicle, wherein the harness prevents or greatly reduces the chance of the animal's lower quarters from being forced under the animal's head and shoulders, reduces the amount of rotational movement, reduces the side to side movement, reduces the chance for the dog to be forced off the car seat and reduces the amount of head excursion during a vehicle crash or a sudden stop.

15 Claims, 38 Drawing Sheets

(56) References Cited

U.S. PATENT DOCUMENTS

| | | | | |
|---|---|---|---|---|
| 5,915,335 | A * | 6/1999 | Holt, Jr. | A01K 1/0263 119/770 |
| 5,934,224 | A * | 8/1999 | Sporn | A01K 27/002 119/792 |
| 6,085,694 | A * | 7/2000 | Simon | A01K 27/002 119/792 |
| 6,101,979 | A * | 8/2000 | Wilson | A01K 27/002 119/725 |
| 6,164,245 | A * | 12/2000 | Johnson | A01K 27/002 119/712 |
| 6,450,130 | B1 * | 9/2002 | Goldberg | A01K 1/0263 119/771 |
| 6,543,390 | B2 * | 4/2003 | Lowery | A01K 1/0263 119/771 |
| 6,564,749 | B1 * | 5/2003 | Dorsey | A01K 1/0263 119/771 |
| 6,601,540 | B1 * | 8/2003 | Davis | A01K 1/0263 119/771 |
| 6,637,377 | B2 * | 10/2003 | Lobanoff | A01K 1/0263 119/770 |
| 6,820,902 | B2 * | 11/2004 | Kim | A41D 13/018 280/748 |
| D511,596 | S * | 11/2005 | Mugford | D30/152 |
| 7,343,881 | B2 * | 3/2008 | Schantz | A01K 13/006 119/771 |
| 7,357,099 | B2 * | 4/2008 | Smith | A01K 1/0263 119/771 |
| 7,383,789 | B2 * | 6/2008 | Wilkes | A01K 1/0272 119/28.5 |
| 7,387,088 | B2 * | 6/2008 | Sporn | A01K 27/002 119/792 |
| 7,699,348 | B2 * | 4/2010 | Singh | B60R 22/10 119/771 |
| D621,561 | S * | 8/2010 | Siklosi | D30/151 |
| 7,992,524 | B2 * | 8/2011 | Falwell | A01K 1/04 119/769 |
| 8,166,924 | B2 * | 5/2012 | Cho | A01K 27/002 119/792 |
| 8,622,431 | B2 * | 1/2014 | Singh | B60R 22/10 280/806 |
| 8,739,739 | B2 * | 6/2014 | Davis | B60R 22/10 119/771 |

* cited by examiner

Prior Art Harness

A

B

C

Prior Art Harness

D

E

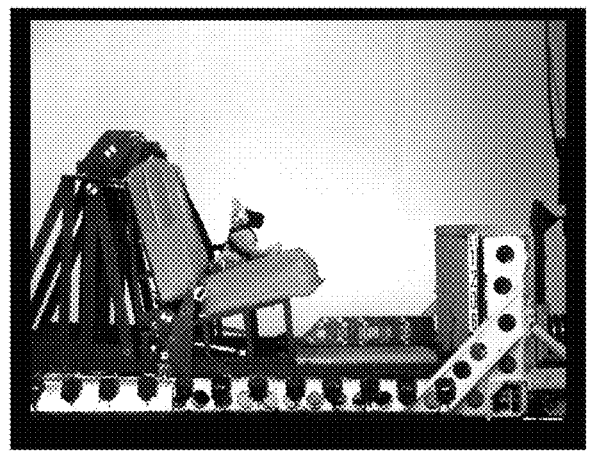
Prior Art Harness
F
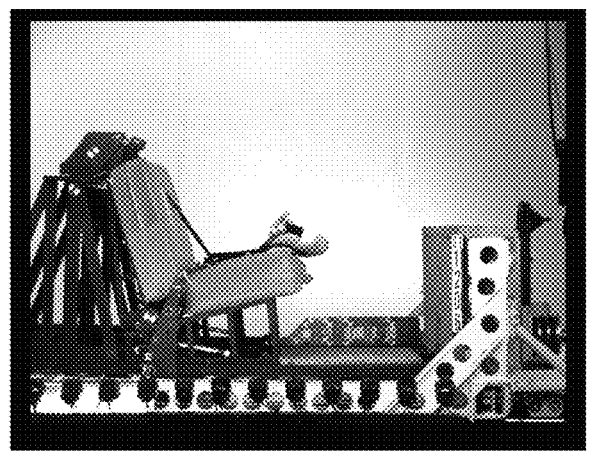
G
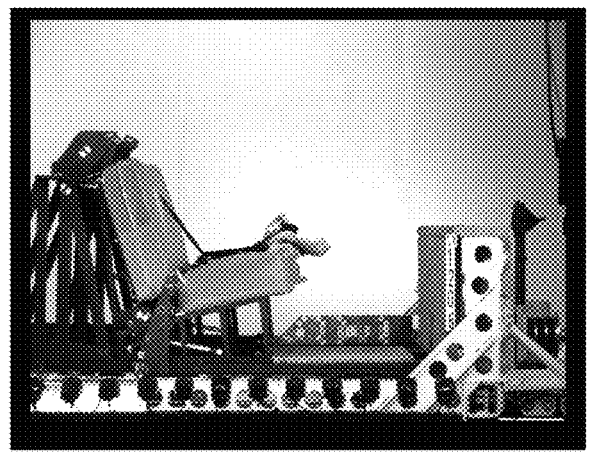
H
Figure 1 (Cont,)

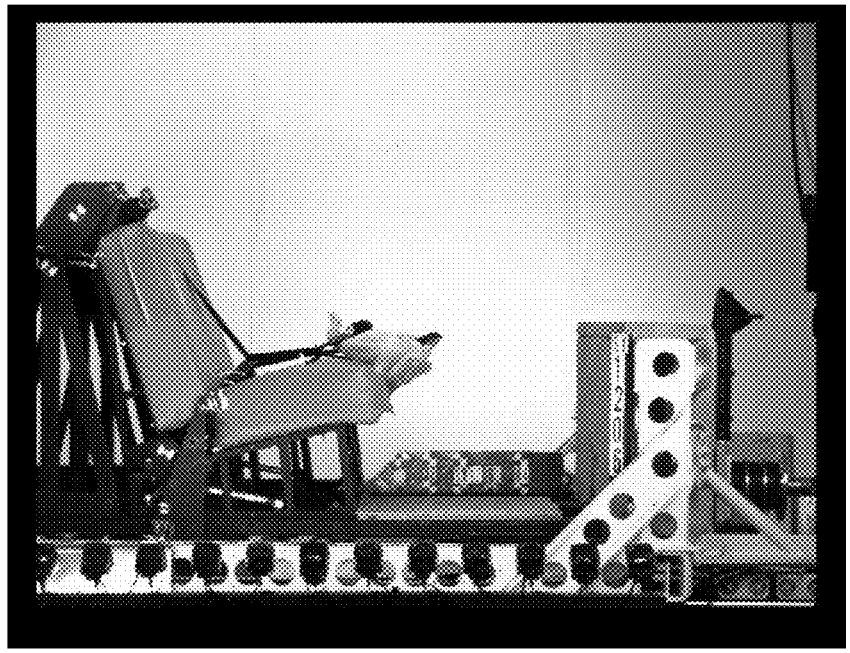
Prior Art Harness
I
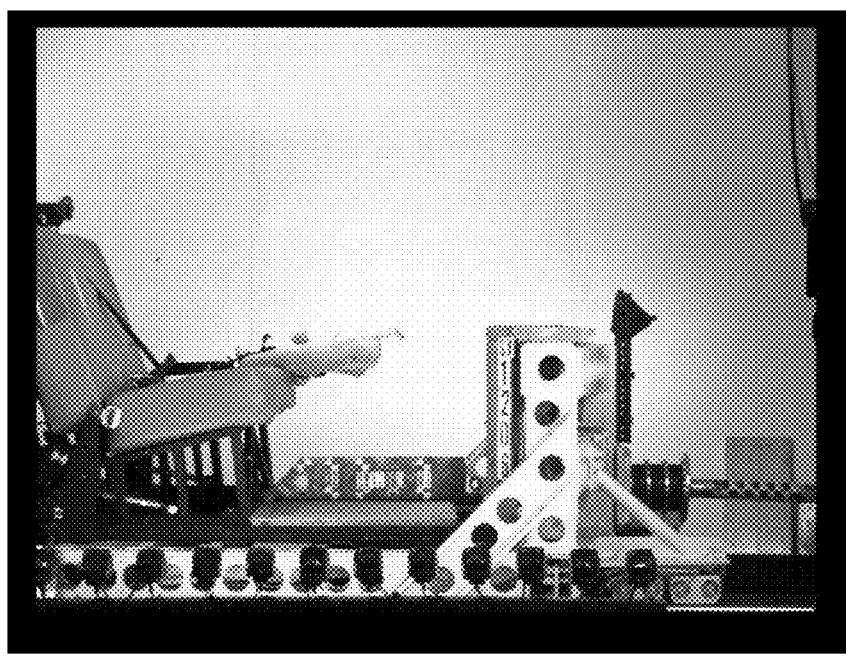
J
Figure 1 (Cont,)

D

E

F

VEHICLE PET HARNESS

BACKGROUND OF INVENTION

Considerable advances have been made in protecting human occupants in motor vehicles in the event of a crash. However, the safety of pets and animal companions has not been the focus of those in disciplines that focus on vehicle safety. Further, many of the devices that have been developed and/or have entered the marketplace either do not increase the safety of the animal or can lead to even greater injury to the animal or death.

SUMMARY OF INVENTION

The most dangerous collisions for people and animals are head-on collisions. Head-on collisions force vehicle occupants forward with a large amount of energy causing injury and death. Human occupants are held in place and kept from striking the inside of the vehicle with seat belts and protected with air bags. Vehicle seat belts are inappropriate and ineffective for protecting animals during a collision. Further, without limitation of animal movement within the vehicle, airbags may cause injury or death to an unsecured or poorly secured animal.

In one aspect, the invention relates a pet harness for use in, for example, motor vehicles. The harness of the present invention solves the problems associated with the harnesses of the prior art by employing a novel and non-obvious design that, at least in part, utilizes the animal's weight distribution and geometry to provide for a device with improved safely attributes over the devices presently known in the art. Thus, the harness of the present invention prevents or lessens submarining, rotation, head tilt or excursion and seat ejection problems of the prior art harnesses during vehicle accidents and sudden stops.

The vehicle pet harness of the present invention contemplates a harness that prevents the "submarining" of the animal during a collision. "Submarining" is when the lower part of the animal, i.e., the rear quarter or haunches, is forced forward under the head, shoulders and torso of the animal by the forward momentum of a collision. This can happen when, for example, with certain prior art harnesses, the animal is secured by the head, neck, shoulders and/or upper torso. The unfortunate result often is that the animal is choked, strangled or suffers cervical dislocation as a result of the poor harness design during a collision. See, FIGS. 1A-1F.

The design of prior art harnesses can also cause the harnessed animal to be subject to harmful or damaging rotational forces from the accident. The rotational forces can cause the animal to be forced against parts of the harness that are not designed to secure the animal properly (such as extension tethers) causing device failure and/or injury to the animal. The twisting motion caused by the rotational force may result in internal injury including internal bleeding or paralysis.

Prior art harnesses also permit head tilt or head excursion, a head tilt or head excursion is when the animal's head is forced downward by the force of an accident or sudden stop potentially causing injury to the animal's neck. Such injuries may include muscle strain and tearing and damage to vertebrae.

Seat ejection results when the animal is not properly secured, as is the case with many prior art animal harnesses, and the animal is thrown from the seat by the force of the impact. Depending on how the animal is secured by the prior art harness, severe injury may result including strangulation and cervical dislocation.

To prevent submarining, rotation, head tilt and seat ejection the harness of the present invention utilizes a chest support, back straps and attachment points located on either side of the animal and at or below the animal's "center of gravity" (also may be referred to as "center of mass") and is defined herein as "a distribution of mass in space that is the unique point where the weighted relative position of the distributed mass sums to zero," and at both sides of the animal. The chest support allows the force in a collision to be spread out (distributed) on a large area of the animal's body. The harness of the present invention also utilizes attachment points that are located on either side of the animal and at a position at or lower than the animal's center of gravity. Thus, any forward motion that is generated from a collision is directed to and absorbed in the animal's chest area, not unlike seat belts used by people. The design of the harness of the present invention distributes the force of the accident such that the hindquarters of the animal are not propelled forward and under the head and forequarters of the animal, the animal does not rotate or rotation is minimized, head tilt is minimized or eliminated and the animal is not ejected from the seat. Thus, the design of the harness of the present invention prevents the submarining, rotation, head tilt and seat ejection of the animal. See, FIG. 2A-2F.

With the design of the harness of the present invention, all forces in a frontal collision or sudden stop are transmitted to the main safety webbing to avoid relying on weaker parts such as buckles and slides. Continuous webbing loop without breaks is employed until the D-rings for the harness shown in FIG. 5. For the harness shown in FIG. 8, the main webbing is preferably made with one strip that is joined at the ends near the bottom of the chest piece. After testing various designs we have realized that nothing is as strong and flexible as relying solely on just the main webbing to hold the dog securely.

The phrase "attachment point(s) at or below the animal's center of gravity" shall mean herein, for example, that the attachment points are located at the animal's side, below and behind the animal's shoulder. Another way to define the phrase is that the attachment points are located below the midpoint between the animal's umbilicus than the animal's spine and about half way between the animal's withers and croup (see, FIG. 3 for a depiction of a dog with various parts named). Yet another way to define the term is that the lower attachment points are located at the animal's flanks. Still another way to define this term is that the area is located between the animals fore and rear legs and below the animal's midpoint on its side. See, FIG. 4, which gives a visual representation of the location of the area of attachment. The term "attachment point(s)" is synonymous herein with the term "lower attachment point(s)." The "attachment point(s)" of the present invention also include, for example and as described below, the point at which a seatbelt is inserted into the harness or under a strap of the harness of the present invention.

Another method of achieving the effect of "lower attachments points" is to utilize a design that transmits the force of the impact to the area of the animal depicted in FIG. 4. Thus, it is also contemplated that the "attachment points" of the harness to the vehicles retaining device (e.g., seat belts or LATCH devices), the harness transfers the forward motion caused by a vehicle accident to the area depicted in FIG. 4 to prevent submarining, rotation, and seat ejection of the animal during the vehicle accident. The positioning of the straps of the harness would allow for this embodiment.

In one embodiment, the harness of the present invention comprises a chest support, straps (i.e., back-straps) that originate at the upper corners of the chest support, traverse the animal's back crossing each other, and connect to the chest support at the diagonal corner or diagonal location from where they begin. The diagonal corner (or diagonal location) is defined herein as the corner (or location) on the opposite side and opposite end of item (e.g., the chest support). For example, the corner that is the diagonal corner of the upper right corner is the lower left corner. Thus, the strap connected at the corner of the chest support near the animal's front right shoulder traverses the back of the animal and is connected to the corner of the chest support at the position nearest the left rear leg of the animal. See, FIG. 6A-K. Further, the straps of the harness may be adjustable in length to ensure proper fit on the animal.

In another embodiment of the harness of the present invention, the harness comprises a back strap(s) that originate at the upper corners of the chest support and traverse the animal's upper back/neck area to connect at the opposite upper corner of the chest support. The strap(s) may be connected/disconnected at the back of the animal for easy fitting and removal onto and off of the animal. The straps are connected/disconnected with a connecting device. The connecting device may be selected from, e.g., buckles, clasps, snaps, snap buckles, hook and loop fastener (Velcro™), hooks and buttons. This strap(s) is referred to herein as the "upper back strap." This embodiment of the harness may also have a strap(s) that originates that the lower corner of the chest support and traverses the animal's back to connect at the opposite corner of the chest support. The strap(s) may be connected/disconnected at the back of the animal for easy fitting and removal onto and off of the animal. The straps are connected/disconnected with a connecting device. The connecting device may be selected from, e.g., buckles, clasps, snaps, snap buckles, hook and loop fastener (Velcro™), hooks and buttons. This strap(s) is referred to herein as the "lower back strap." The upper and lower back straps are connected to each other by a left and a right connector strap that runs essentially perpendicular to the upper and lower back straps. The left and right connector straps having a top and bottom end, the top end of the right back strap connecting to the right portion of the upper back strap and the lower end of the right back strap connecting to the right portion of the lower back strap; the top end of the left back strap connecting to the left portion of the upper back strap and the lower end of the left back strap connecting to the left portion of the lower back strap.

Further, as defined herein, the term corner does not necessarily refer to a right angle, an angle or any particular degree or any other geometric shape but, rather refers to a position in relation to other positions on the item being described. Thus, for example, a chest support that is generally triangular shaped may have four "corners" or connection points, one connection point (i.e., corner) at or near each of the four legs with, for example, the two corners nearer the forelegs separated by a portion of the chest support and the two corners nearer the hind legs (relative to the front legs) connected to the same point or near the same point of the chest support. See, e.g., FIG. 5. Further still, the chest support of the harness of the present invention may be, for example, "Y" shaped or "T" shaped with the open portion of the "Y" (or "T") being positioned near the animals forelegs and the bottom of the "Y" (or "T") being positioned nearer the hind legs (relative to the front legs). The invention is not limited by the shape of the chest support so long as the chest support is effective in securing the animal and aids in the prevention of injury to the animal during an accident.

The back straps of the harness of the present invention may have buckles or other attachment means (known to one of ordinary skill in the art) by which they attach to the chest support. In the context of the present invention, the term "buckle" refers to any means known to one of ordinary skill in the art for mechanically reversibly connecting and reconnecting straps together such as a buckle, snap buckle, snaps, clasp, hook, latch, etc. In another embodiment, the back straps are permanently attached to the chest support at the "corners" but have an attachment means (e.g., buckles, connectors, or any suitable connector device known to one of ordinary skill in the art) to attach to the reciprocal portions of each strap at or near the animal's sides or back. That is, each of the back straps comprise two sections that are reversibly connectable to each other. This design may make it easier for the person putting the harness on the animal. In another embodiment, the back straps are reversibly connectable to the chest support. In yet another embodiment, the straps, rather than being reversibly connectable to each other or the chest support, are length adjustable. In this embodiment, the straps are lengthened to put the harness on the animal and shortened to achieve a proper fit. Back straps that are reversibly connectable to each other or the chest support may also be length adjustable.

The harness of the present invention may also comprise a neck strap or collar. The neck strap or collar can aid the person by providing a place to attach a leash or lead for handling the animal, for example, into and out of the vehicle. The neck strap or collar is not designed to or used to provide restraint to the animal in the event of a vehicle collision or accident so as to prevent the animal from being choked. The force of the collision is designed to be directed to the chest of the animal via the low attachment points, the back-straps and the chest support.

In one embodiment of the harness of the present invention, it is contemplated that the upper back strap also is used as a collar. In this regard, the upper back strap comprises two rings (for example, "D" rings) to which a leash, for example, may be attached. In a preferred embodiment, a first ring is located on one side of a clip, clasp or other device used to connect a left and a right portion of the upper back strap to each other and a second ring is located on the other side of the clip device. See, FIGS. 5 and 8. The effect of this design is to ensure that any force from the animal to the leash is transferred through to the rings to the straps and not directly to the clip or clasp since the clip or clasp is usually weaker than the rings or strap material.

The harness of the present invention comprises points to which the harness is attached to the vehicle on the straps that traverse the animal's back. The attachment points are located, for example, in front of the hind quarters and below the midriff of the animal. That is, at or below the animal's center of gravity. The harness can be attached to the vehicle's LATCH (Lower Anchors and Tethers for CHildren) attachment points by way of length adjustable tethers (which also may be referred to as straps or securing straps). The tethers can attach to the harness and LATCH attachment points by way of any suitable attachment means or attachment device. For example, one or more of snap hooks, buckles, clasps, quick release couplings, vehicle seat belt-type buckles, etc., may be utilized. The only requirement is that the attachment means or device be strong enough as to not break in the event of an accident or collision. For vehicles such as trucks and SUVs, the tethers can be attached to the truck's cargo tie down loops directly or to other solid anchor points. It is well known by one of ordinary skill in the art to determine the appropriate specification of the harness of the present invention based on, for example, the weight of the animal being secured and force(s) generated as the result of a collision. For example, a small animal will require a small harness for proper fit. Small animals will also require smaller attachment devices or means where as larger animals will require a larger harness (by comparison with small animals) and larger, stronger attachment devices or means.

The attachment devices and adjustable tethers can attach to the straps of the harness via, for example, D-rings, quick release buckles located on the straps, or any other suitable device known to one of ordinary skill in the art.

The animal may also be additionally and optionally secured by the vehicles three-point or two-point seat belt (safety belt) or the shoulder portion of the three-point seat belt if it is detachable from the lap portion of the belt and securable to the seat belt buckle. The three-point (or two-point) seat belt can be inserted under the harness back-straps at about where the back-straps cross, or under the connecting straps or the seat belt can be inserted into a specifically designed slot or loop incorporated into one of both of the back-straps (such as, but not limited to, the connecting straps) and then the seat belt is secured with the vehicle's seat belt clasp. Although the use of the vehicle's three-point seat belt is contemplated for use in the present invention, it is not required. However, the use of the three-point seat belt is preferred in order to lessen head tilt of the animal during an accident or sudden stop. In other embodiments of the present invention it is the preferred method of attaching the harness of the present invention to the vehicle.

The harness of the present invention is used as follows. The harness is placed on the animal with the chest support at the animal's chest. The back straps are brought over the animal's back and attached to the opposite corners of the chest support. The collar, if present, is also buckled or otherwise secured. The animal is then attached to the vehicle via the harness by connecting the attachment points to the LATCH attachment points via the tethers. The fit is then adjusted so that the animal is held snugly in place but not so tight as to cause discomfort. The harness of the present invention may be packaged with instructions for use. The instructions may include illustrations and/or photographs to aid the user.

The present invention comprises a vehicle harness for an animal, the harness comprising two lower attachment points for attachment to a vehicle, said lower attachment points located on opposite sides of the animal and near or below the animal's center of gravity. The lower attachment points are below the animal's center of gravity when the animal is seated. The lower attachment points are located below the midpoint between the animal's umbilicus than the animals' spine and about half way between the animal's withers and croup. The lower attachment points are located at the animal's flanks. The lower attachment points may comprise "D-rings," circular rings or similar, so long as the lower attachment point can withstand the force generated in a vehicular accident.

The vehicle harness of the present invention may further comprise a chest piece, the chest piece being connected to two back straps positionable over the animal's back, each of said straps attached to said chest piece at the upper, outside edge and at the opposite lower outside edge of the chest piece. The length of said back straps may be adjustable. Each back strap may comprising two sections, the sections being reversibly connectable to each other with a connector and each strap comprising one of the lower attachment points. The chest piece and back straps may be padded for animal comfort.

The chest piece of the harness of the present invention comprises a unique design comprising a chest strap(s). Support for this design can be found in FIG. 5 and in FIG. 8. The chest strap(s) form two sections which extend from the bottom of the chest piece to the upper corners of the chest piece. Between the location at the bottom of the chest piece and the location at the top of the chest piece the chest strap sections are "intertwined," overlapped or tied together at a position to form at least one "knot," said "knot" causing each of the straps to be directed towards opposite corners of the chest piece from which it originated. Further, the "knot" of the present invention preferably allows the chest straps to slide relative to each other. It has been found by the inventors that this design provides a greater amount of strength at the point of impact during a vehicle accident that is superior to that achieved with chest straps that are physically attached to each other. This is because the "knot" allows for the straps to absorb the impact of the accident by tightening and, if necessary, allowing the straps to "slide" or "shift" relative to each other during the impact. Other means such as sewing the straps together would not allow for these unexpected benefits. Further, means of physically attaching the straps together may actually weaken the straps at this contact point over time. Thread used for sewing or other means of attachment could cause the straps to wear prematurely. The chest straps may further be encased or enclosed in a covering or a padded covering to provide additional support and provide comfort to the animal wearing the harness.

The vehicle harness of the present invention may also comprise a neck collar. The neck collar may comprise a buckle and attachment point for a leash.

In an embodiment, the vehicle harness of the present invention maybe secured to the vehicle by the attaching the lower to the LATCH attachment points in said vehicle with tethers. The tethers may be attached to the lower attachment point of the harness and to the LATCH attachment points with, for example, snap-hooks located on either end of the tethers. The length of the tethers is preferably adjustable.

The vehicle harness of the present invention may also comprise a third attachment point, the third attachment point located at the back straps of the harness at or near the animal's shoulders and wherein the third attachment point is securable to the vehicle's passenger safety belt. In this regard, the vehicle's passenger safety belt is insertable under one or both of the straps.

Although any animal that can fit into a passenger vehicle is contemplated for use with the vehicle harness of the present invention (for example, dogs, potbelly pigs or other similarly size animal) the preferred animal is a dog.

Other features and advantages of the invention will be apparent from the following description.

BRIEF DESCRIPTION OF DRAWINGS

FIG. 7C shows the animal returned to the seat after impact. The test was conducted at a federal and state government agency funded facility that runs official NHTSA sled tests using a FMVSS-213 approved bench seat set for child-restraint testing.

FIG. 7A shows the test dummy animal just prior to the moment of impact. FIG. 7B show the test dummy animal during the impact. No submarining, rotation or head tilt is noticed. FIG. 7C shows the animal returned to the seat after impact. The test was conducted at a federal and state government agency funded facility that runs official NHTSA sled tests using a FMVSS-213 approved bench seat set for child seat-restraint testing.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
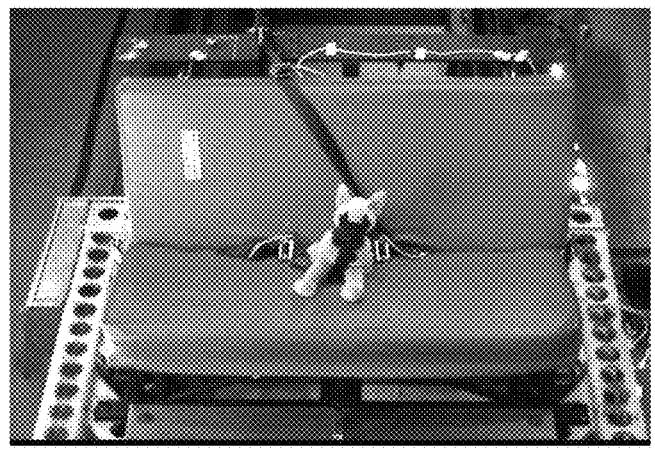
FIGS. 1 A-J show a series of photos from a crash test using a prior art harness design. Figures A-E show the crash test from above. Figures F-J show the crash test from the side. These images from the test film show how the prior art harness can lead to strangulation of the animal. The test was conducted at a federal and state government agency funded facility that runs official NHTSA sled tests using a FMVSS-213 approved bench seat set for child-restraint testing.
Figure 1:
Figure 1:
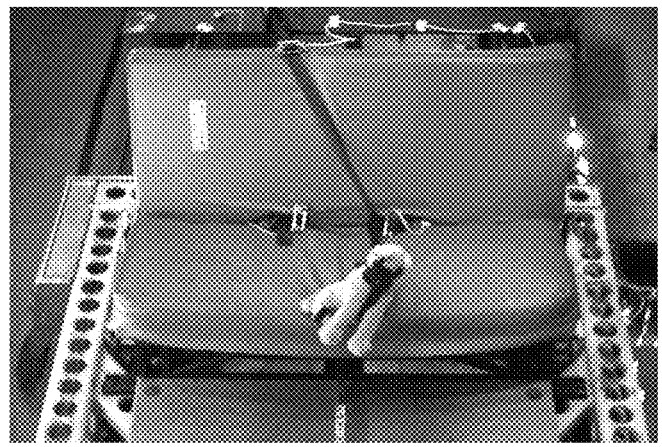
Figure 1:
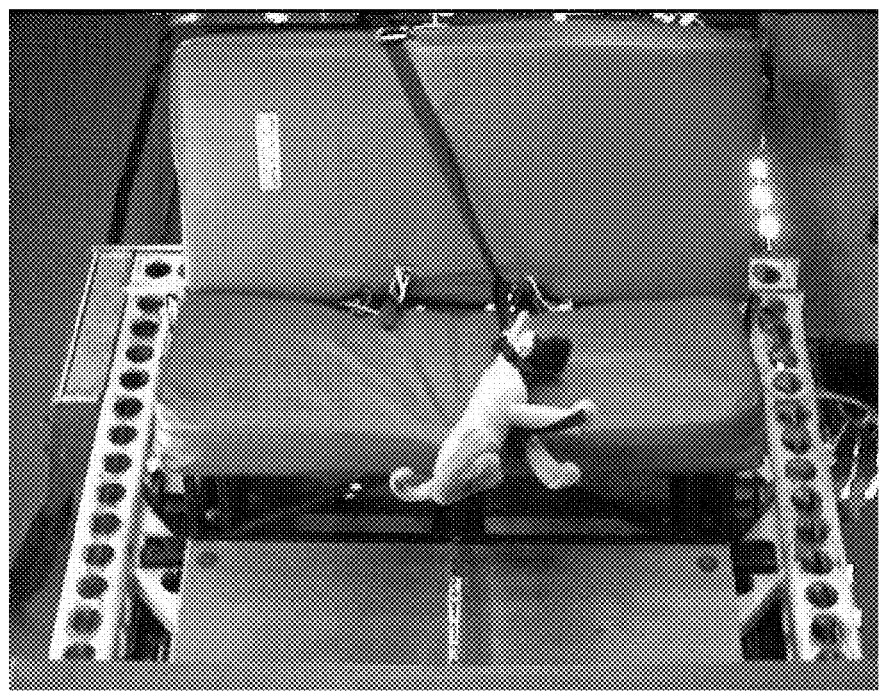
Figure 1:
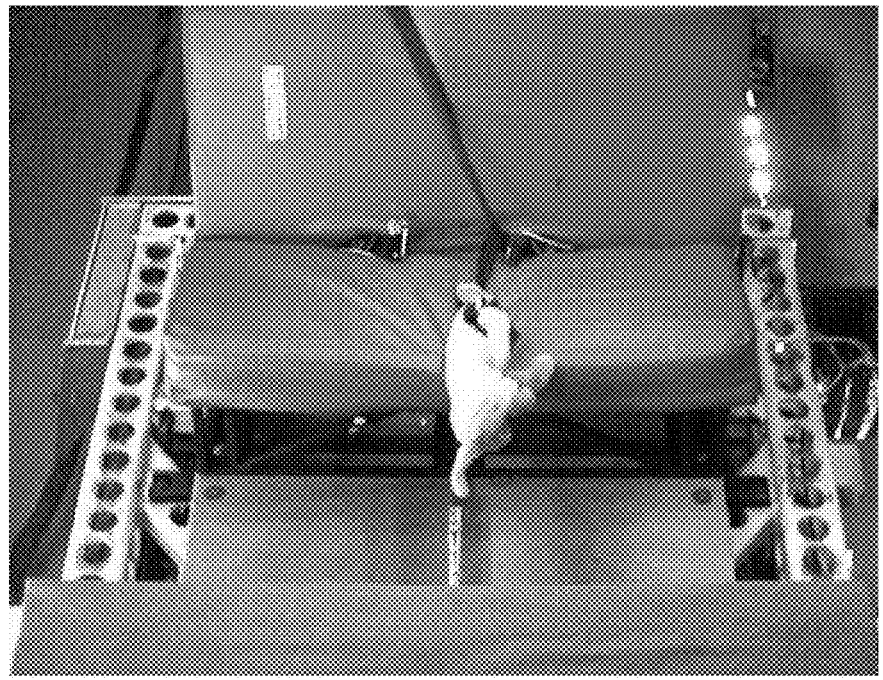
Figure 2:
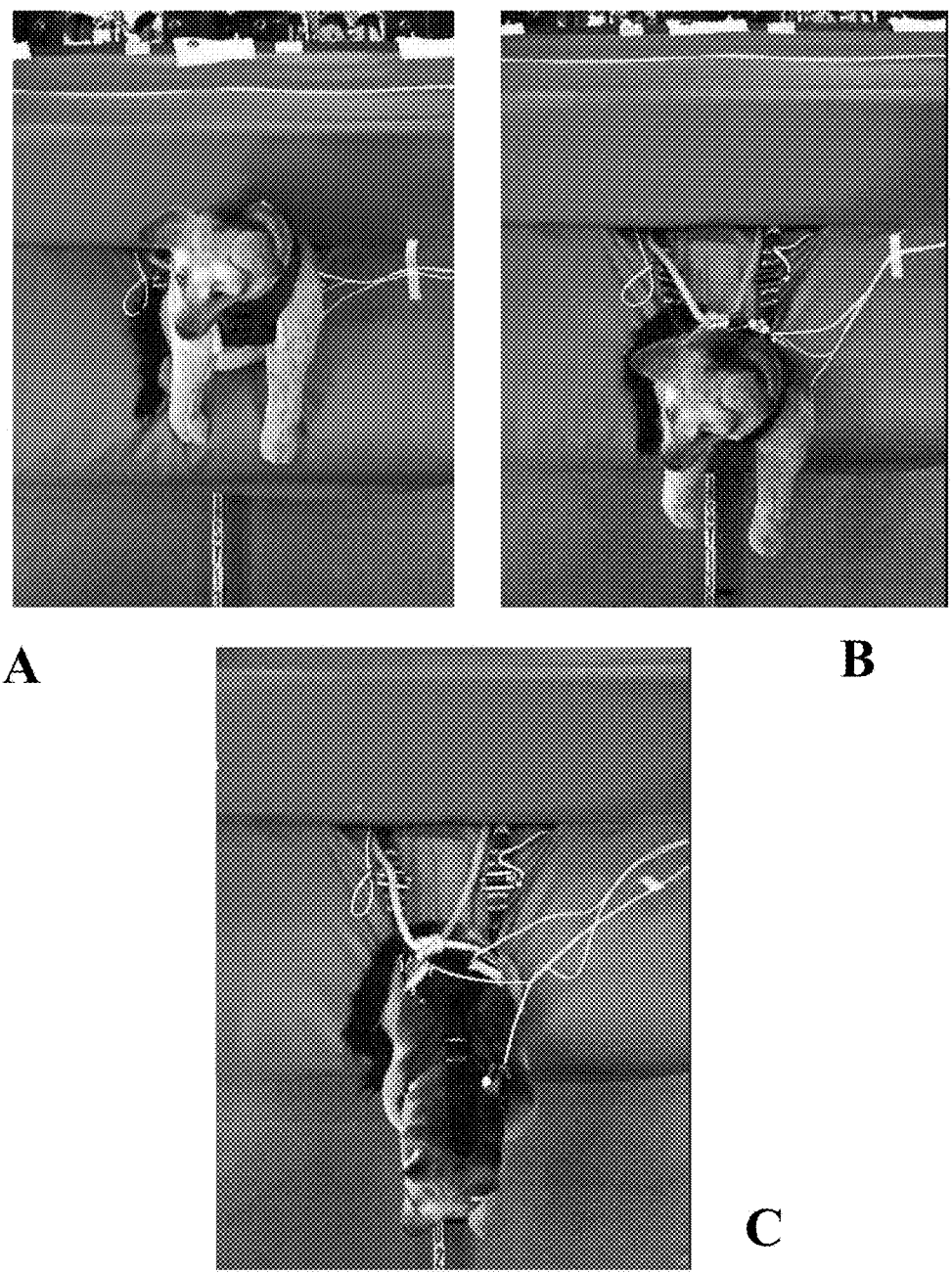
FIGS. 2 A-F show a series of photos from a crash test using a harness design of the present invention. Figures A-C show the crash test from above. Figures D-F show the crash test from the side. These images from the test film shows how the harness of the present invention provides for animal safety in the event of an accident. No submarining, rotation or head tilt is noticed.
Figure 2:
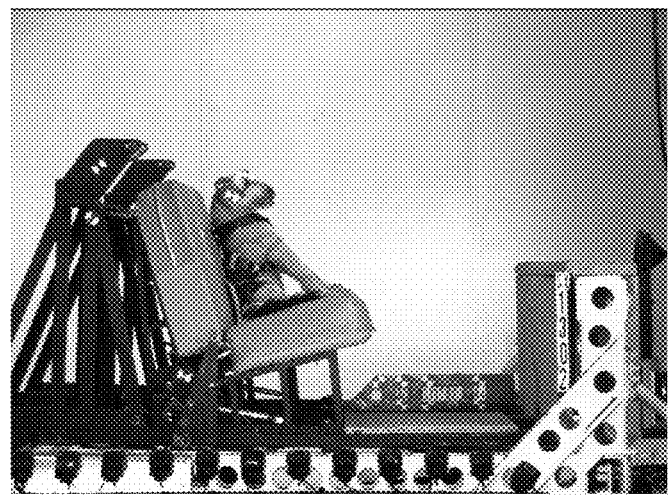
Figure 2:
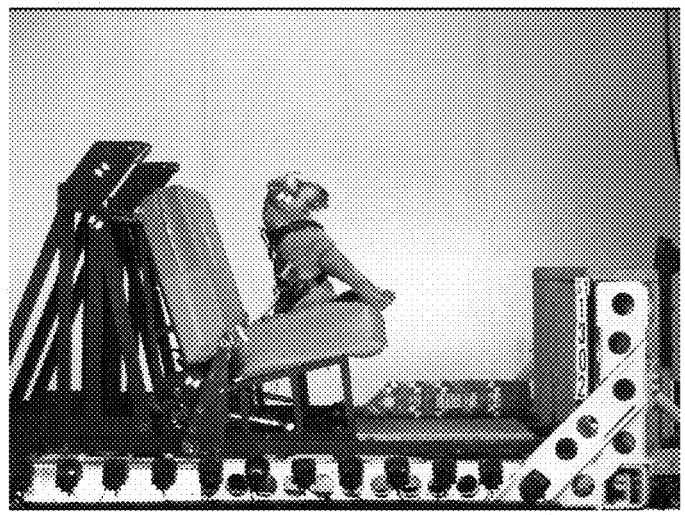
Figure 2:
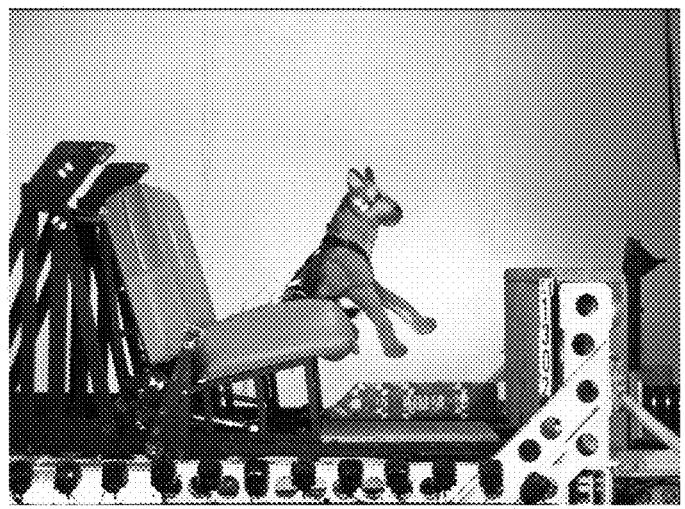
Figure 3:
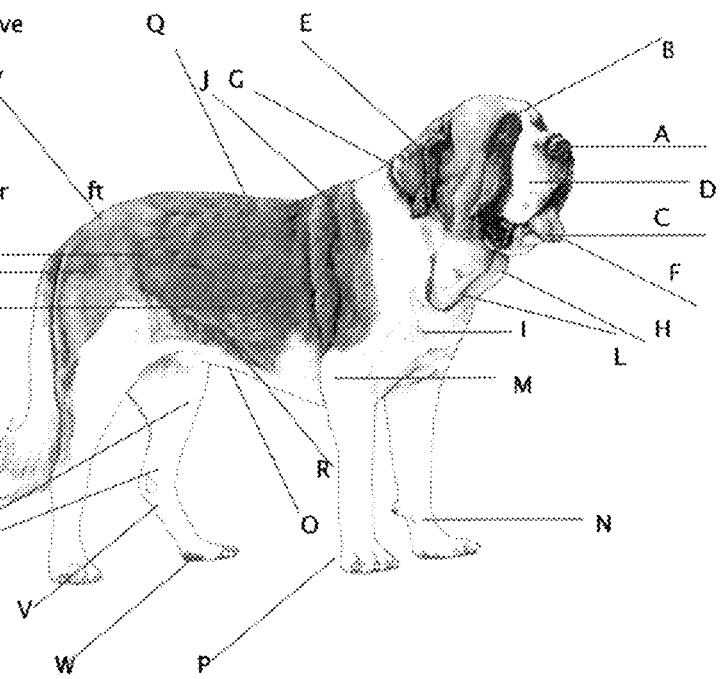
FIG. 3 shows a representation of a dog with various body parts and areas named.
Figure 4:
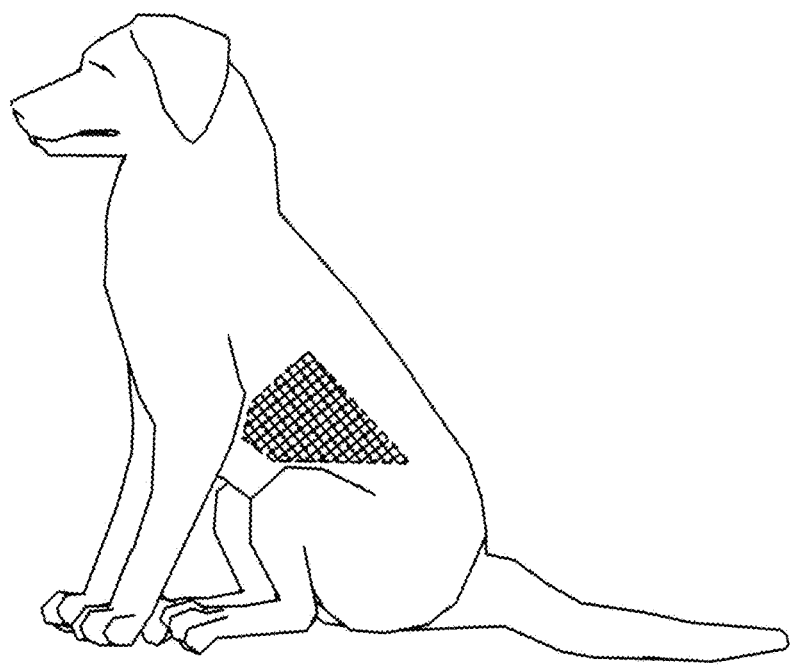
FIG. 4 shows a diagrammatic representation of the position of the lower attachment point(s) or attachment point(s) on an animal wearing a harness of the present invention. Shaded area indicates general area included in the area defined as "near or below the animal's center of gravity."
Figure 5:
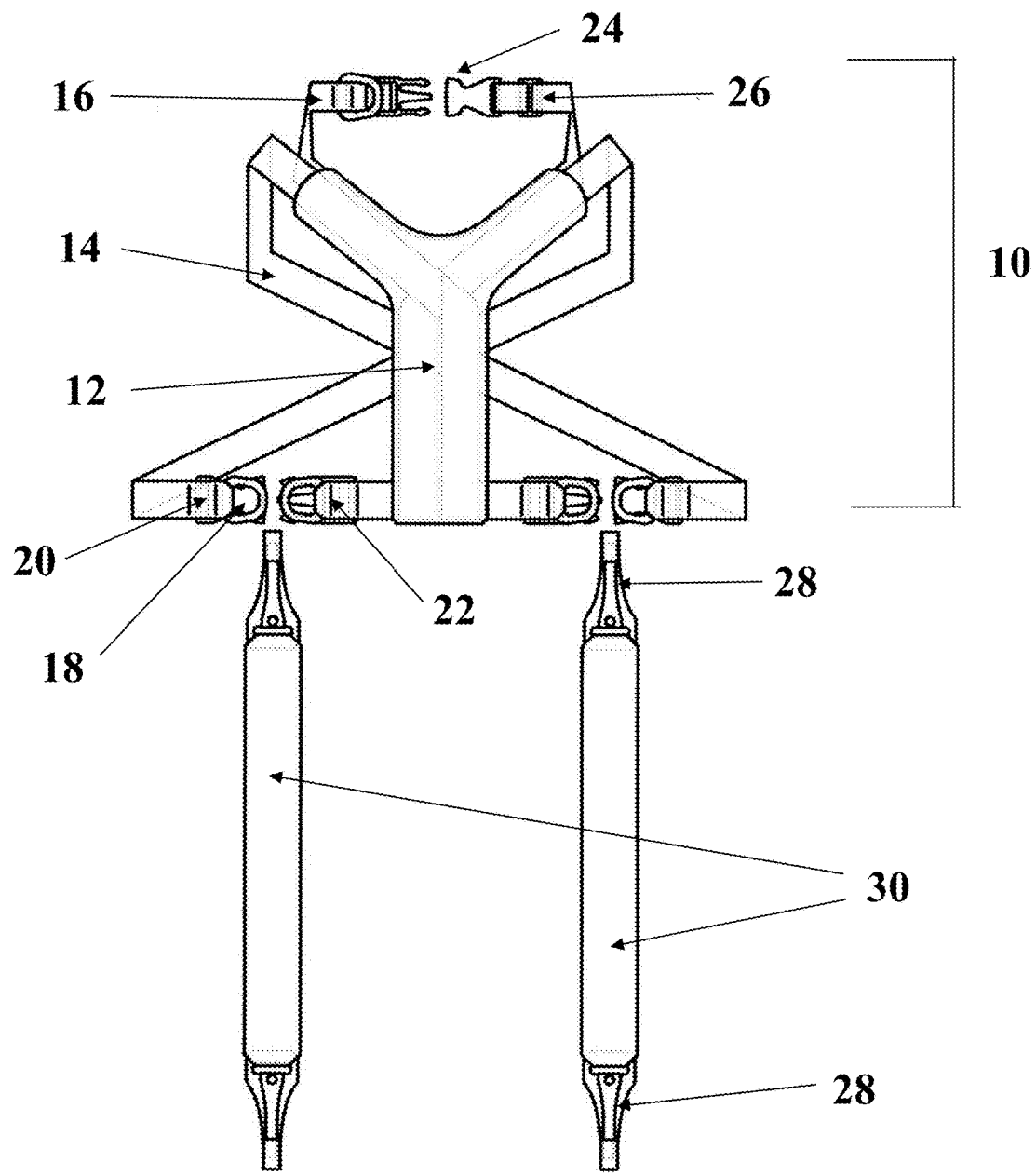
FIG. 5 shows a representation of a chest support of a harness of the present invention. Grey lines indicate that these portions of the back straps are located below or, optionally, enclosed in the chest support portion of the harness. Overlapping the back straps with the chest support piece, as is depicted, creates a stronger harness. The "knot" or intertwining of the chest straps is clearly shown in this figure.
Figure 6A:
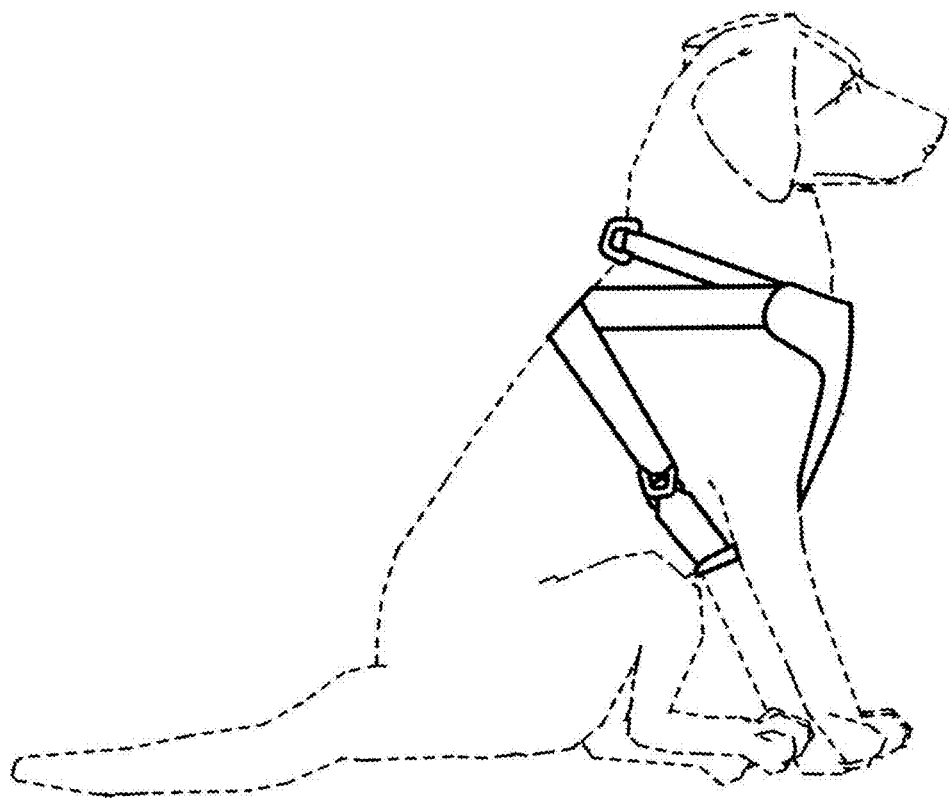
FIGS. 6 A-L show a series of figures of an animal wearing a harness of the present invention. Figures A-F show views including side view, top view, bottom view, front view and rear view of a seated dog. Figures G-L show views including side view, top view, bottom view, front view and rear view of a standing dog.
Figure 6B:
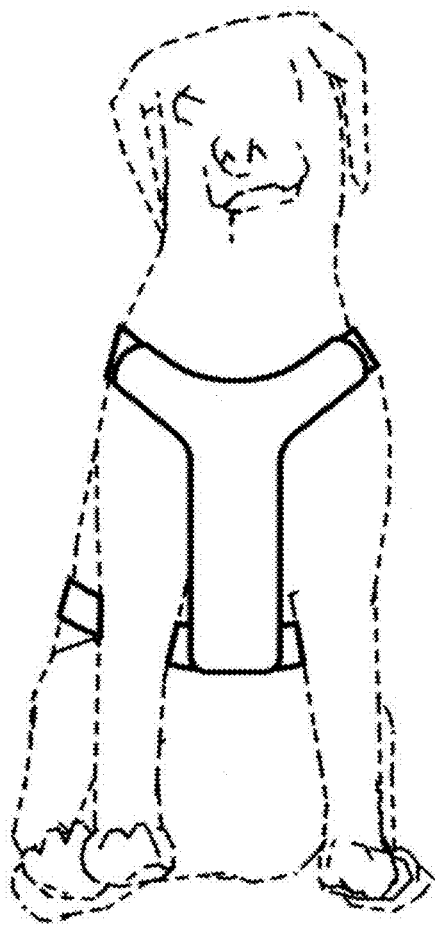
Figure 6C:
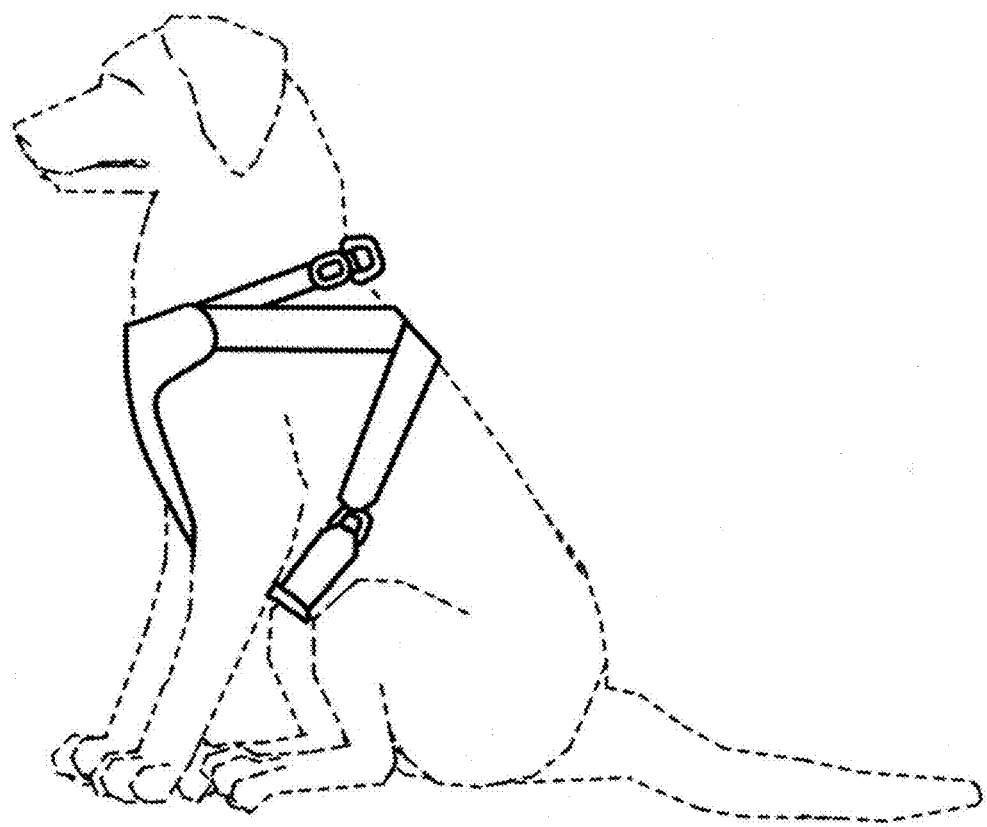
Figure 6D:
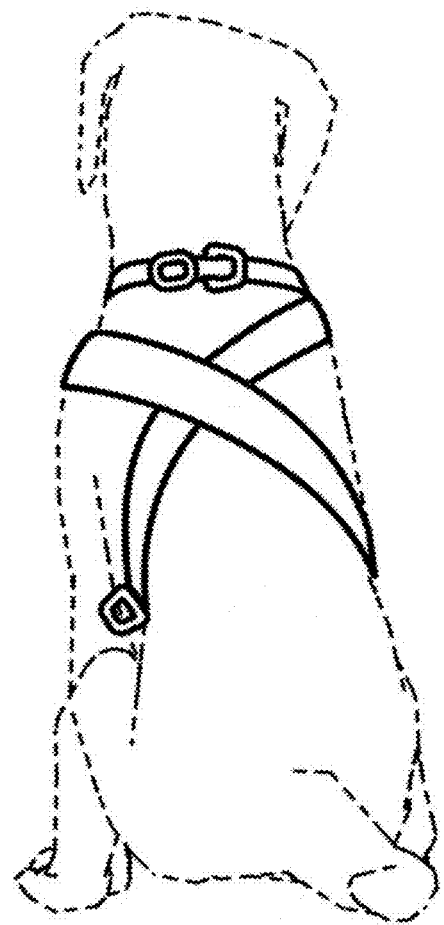
Figure 6E:
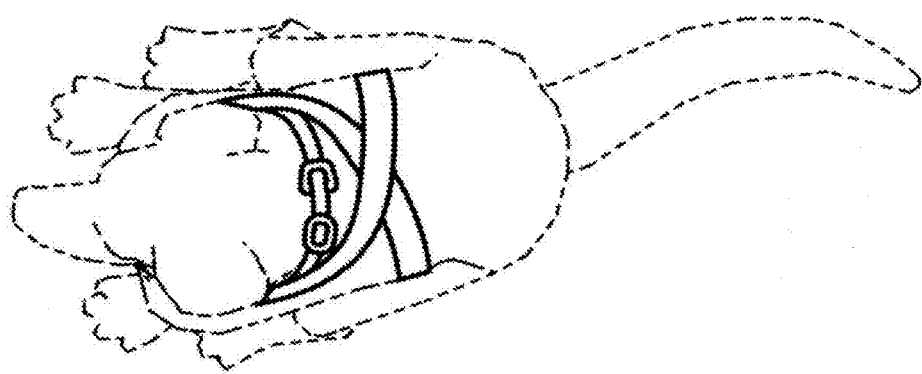
Figure 6F:
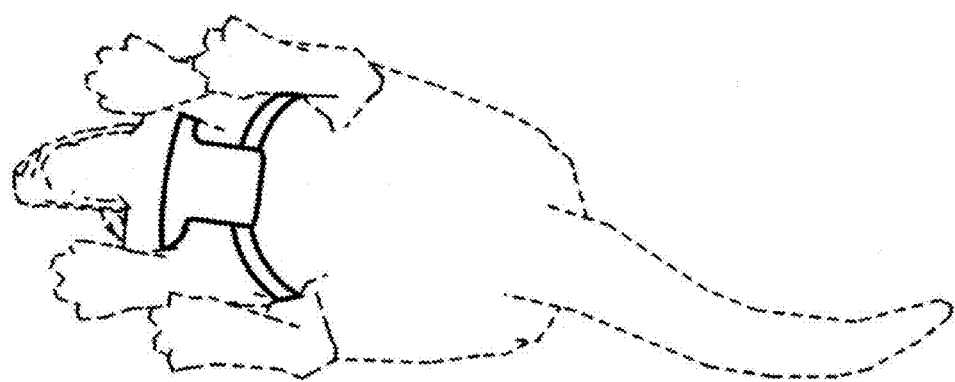
Figure 6G:
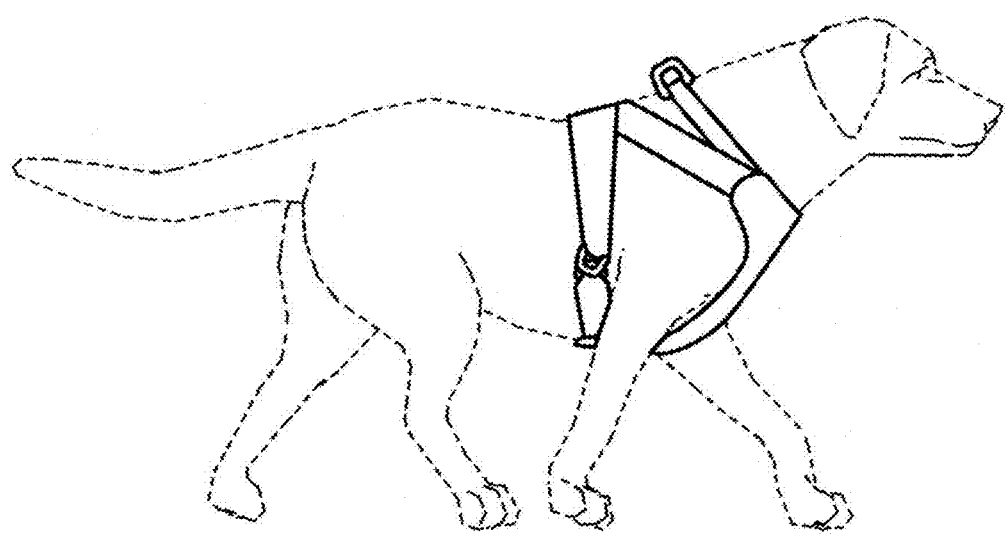
Figure 6H:
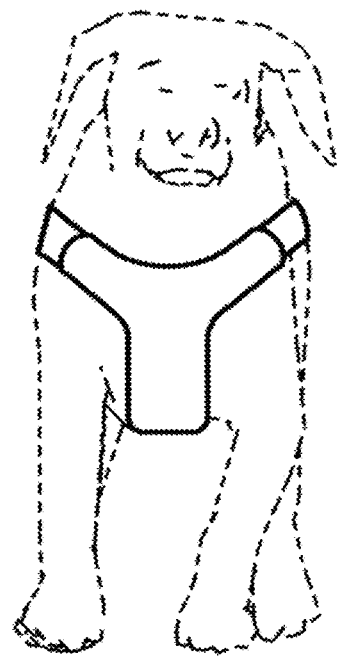
Figure 6I:
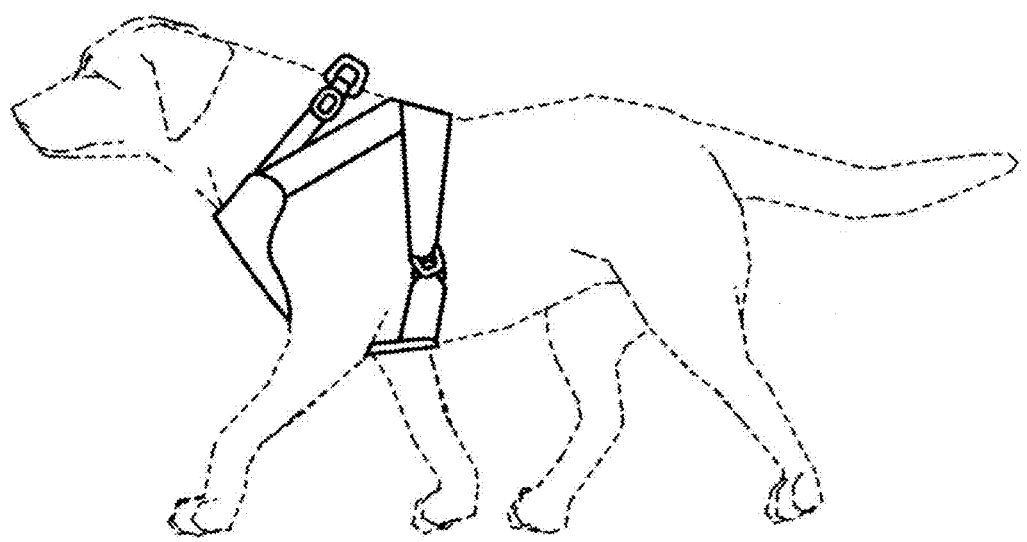
Figure 6J:
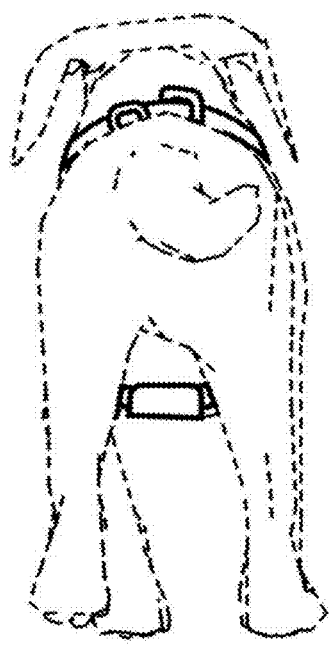
Figure 6K:
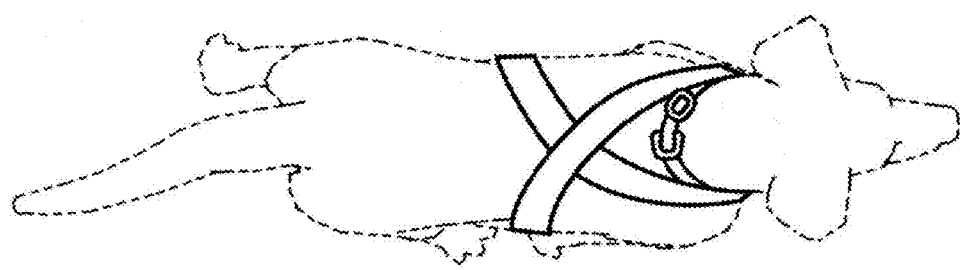
Figure 6L:
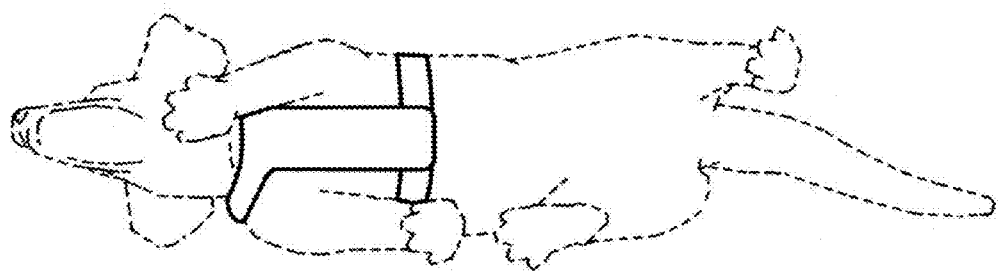
Figure 7:
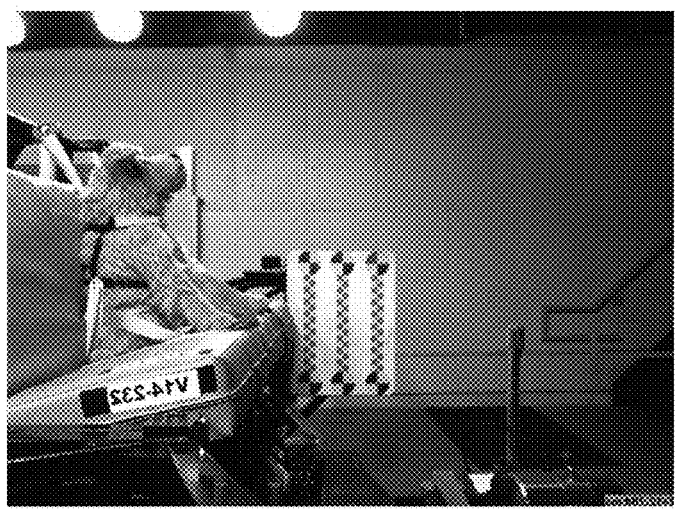
FIG. 7, A-C show a series of photos from a crash test using a harness design of the present invention. Figures A-C show the crash test from the side. These images from the test film shows how the harness of the present invention provides for animal safety in the event of an accident.
Figure 7:
Figure 7:
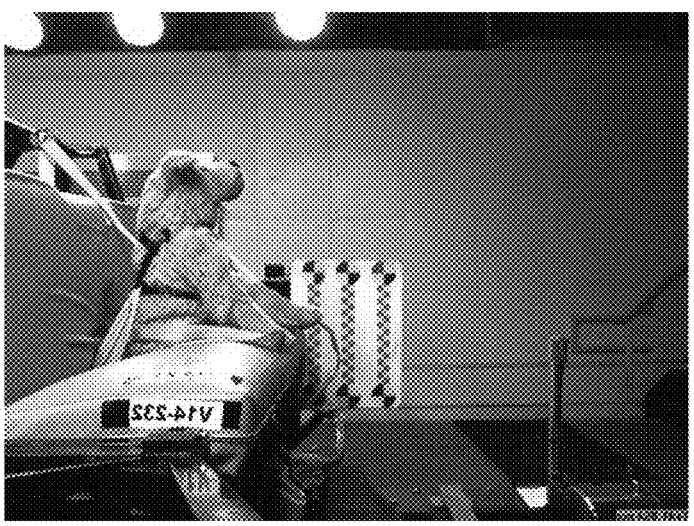

FIG. 5 shows a representation of a harness of the present invention. The actual harness 10 comprises the chest support 12 with chest straps enclosed in a covering and with the "knot" or intertwining of the chest straps clearly visible in grey, the back straps 14 and, optionally, the collar 16. Each back strap comprise the attachment points 18 for the tethers 30 and the buckle 22 and strap adjustment device 20. The chest support and/or back straps may, optionally, be padded. The collar comprises a buckle 24 and a device 26 for adjusting the length of the collar. The tethers 30 comprise snap hooks 28 or similar attachment means at either end as well as a device for adjusting the length of the tether, if necessary. Devices for adjusting the length of straps are known in by those of ordinary skill in the art and may include the use of two "D-rings" through which the strap is threaded and metal or plastic friction devices though which the strap is threaded (see, for example, U.S. Pat. Nos. 3,760,466 and 4,762,369, which are incorporated herein by reference). In brief, any properly sized, device known by one of ordinary skill in the art that exerts enough friction to prevent the straps from sliding when in use but also allows for easy adjustment as desired is suitable for use with the present invention.

Figure 8:
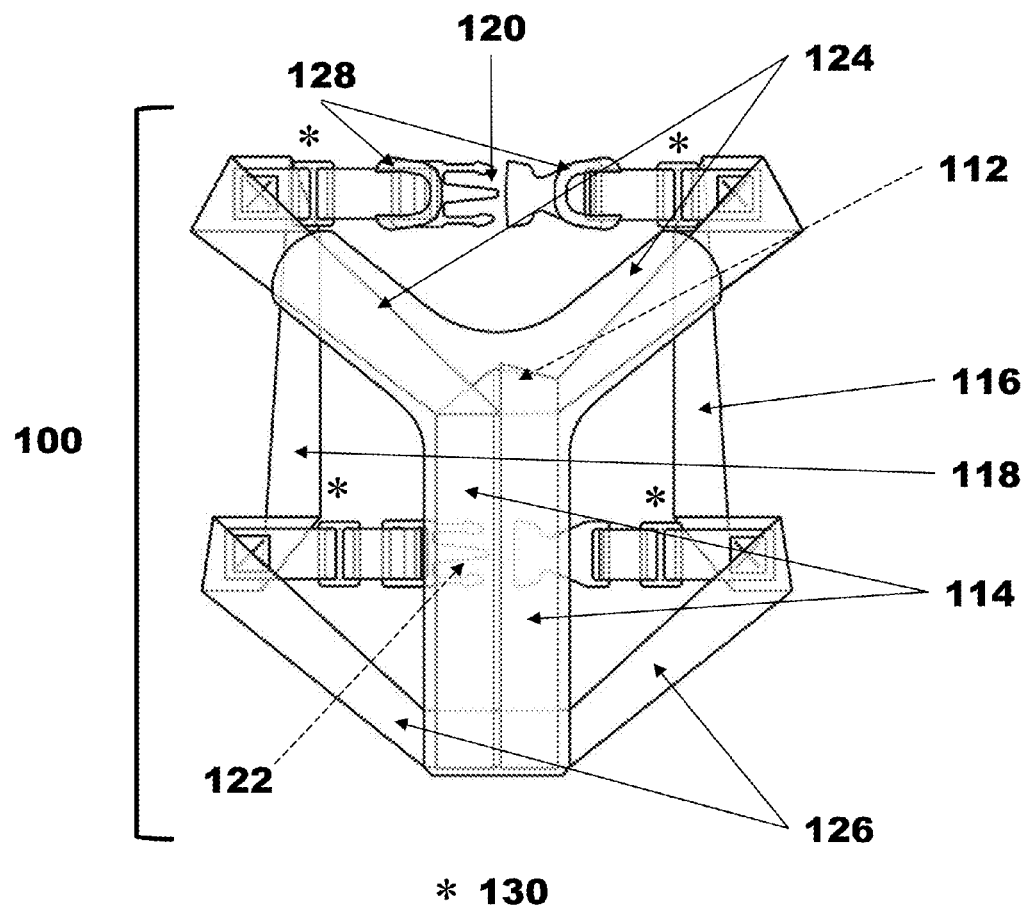
FIG. 8 shows a representation of another embodiment chest support of a harness of the present invention. Grey lines indicate that these portions of the back straps are located below or, optionally, enclosed in the chest support portion of the harness. Overlapping the back straps with the chest support piece, as is depicted, creates a stronger harness. The "knot" or intertwining of the chest straps is clearly shown in this figure. Dashed arrows point to items that are indicated as being located behind or below other parts of the harness. Asterisks (*) indicated the location of item 130.
Figure 9A:
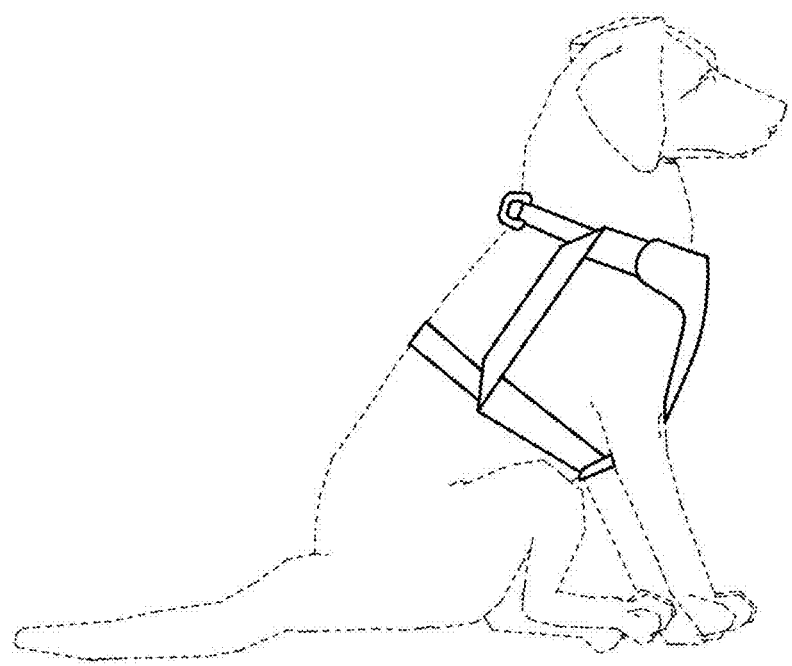
FIG. 9A-L shows a series of figures of an animal wearing a harness of the present invention. Figures A-F show views including side view, top view, bottom view, front view and rear view of a seated dog. Figures G-L show views including side view, top view, bottom view, front view and rear view of a standing dog.
Figure 9B:
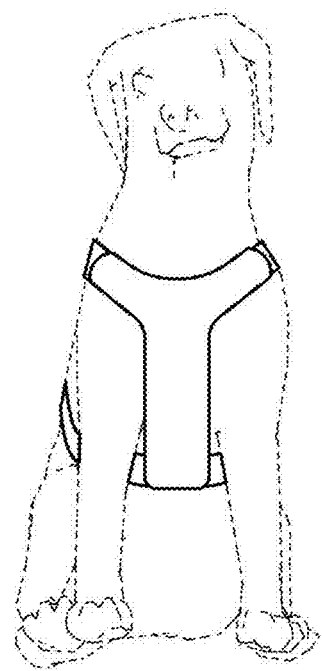
Figure 9C:
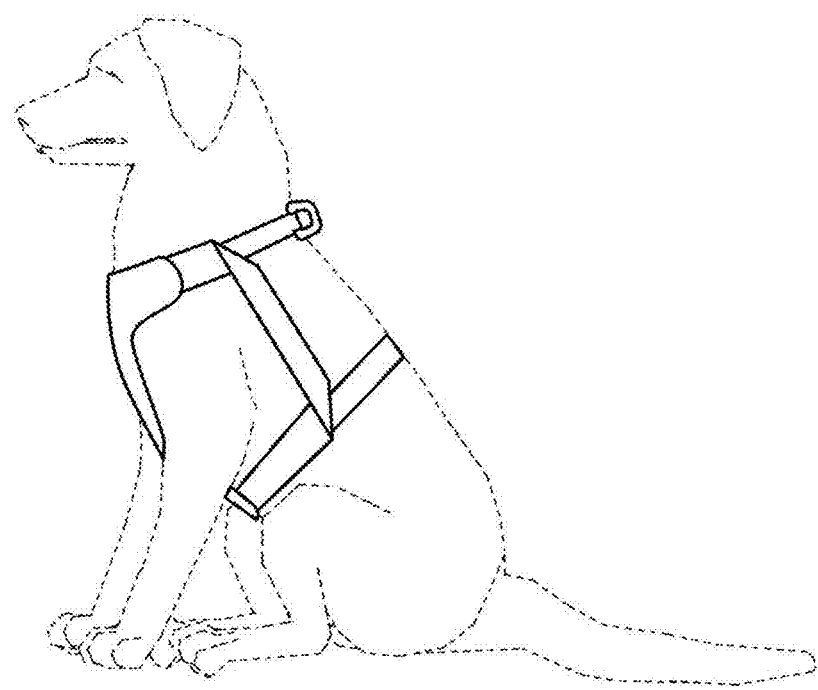
Figure 9D:
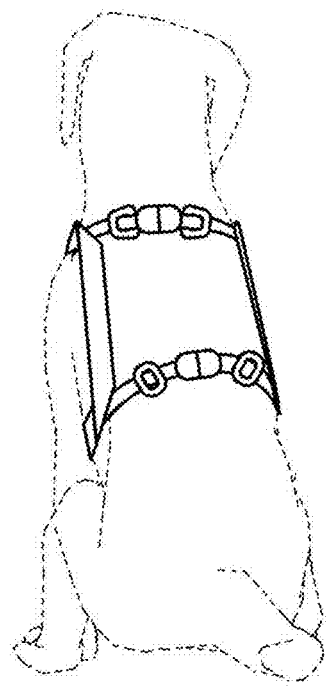
Figure 9E:
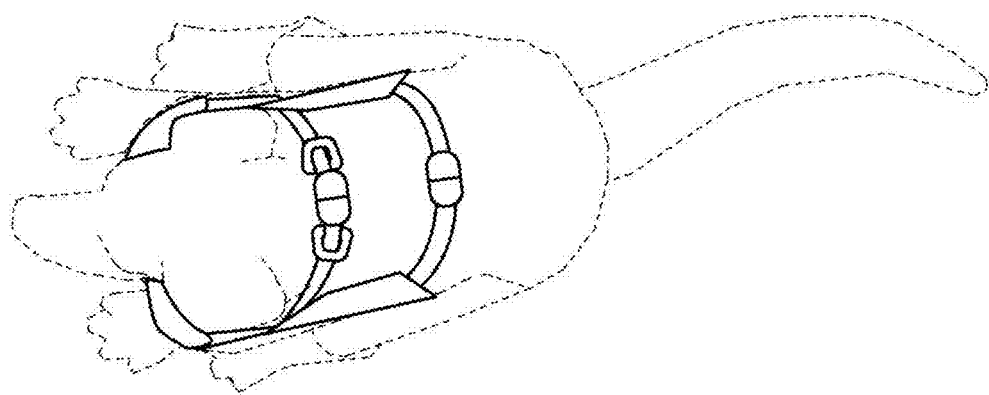
Figure 9F:
Figure 9G:
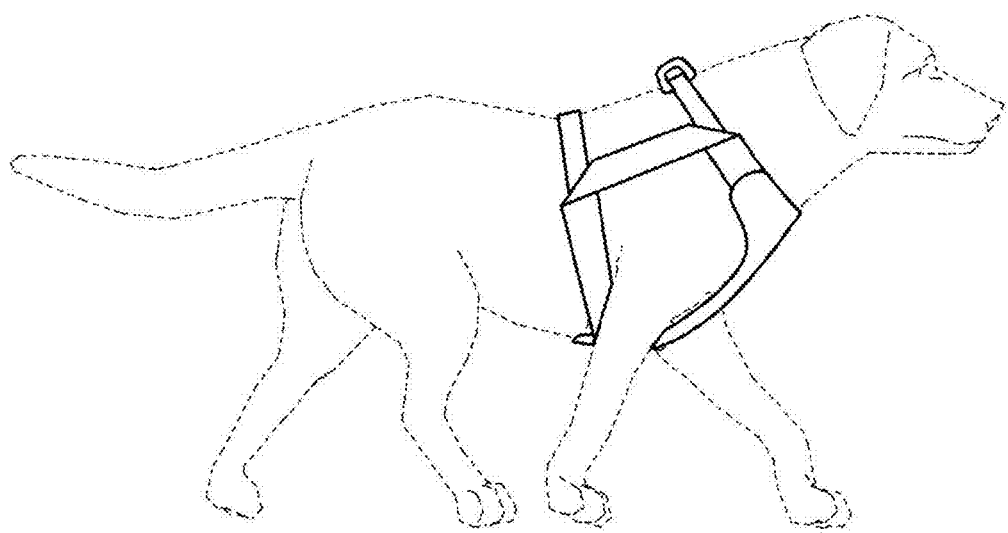
Figure 9H:
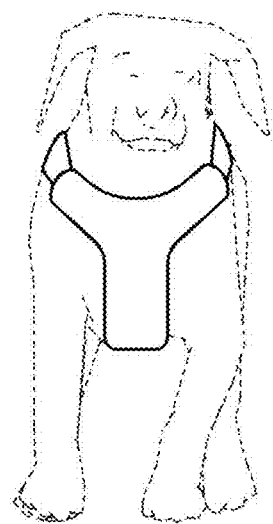
Figure 9I:
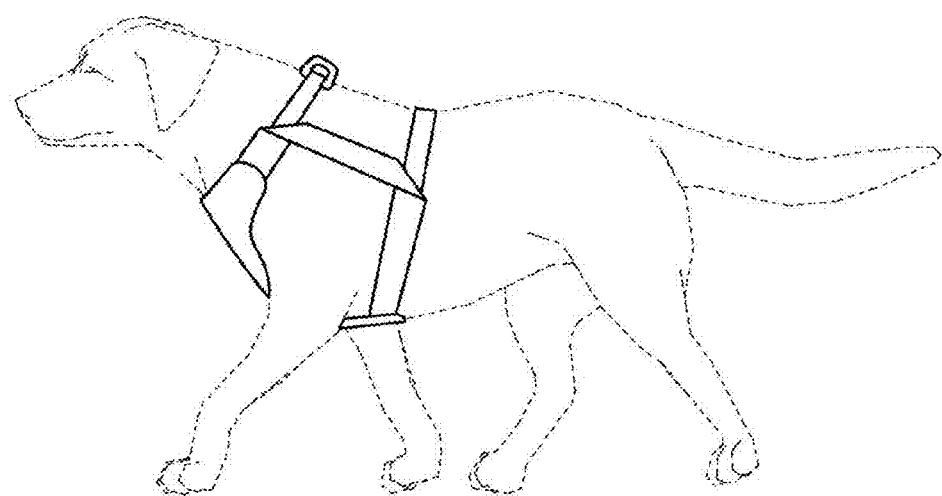
Figure 9J:
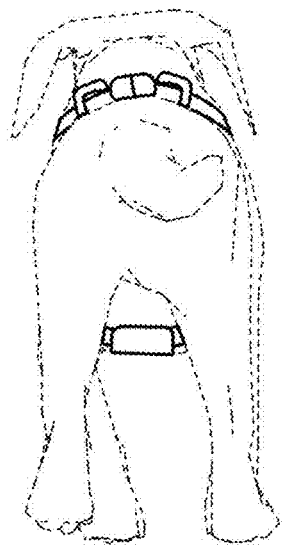
Figure 9K:
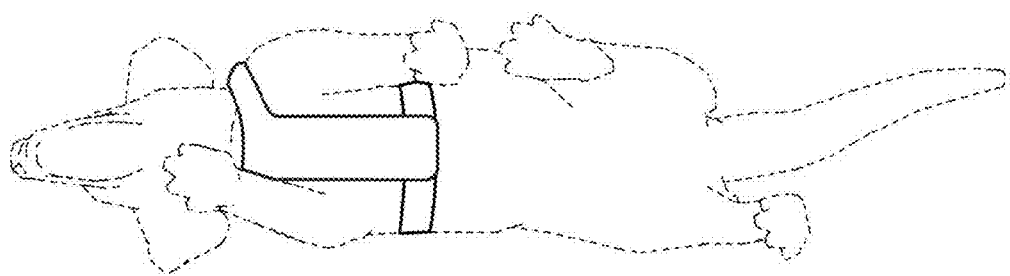
Figure 9L:
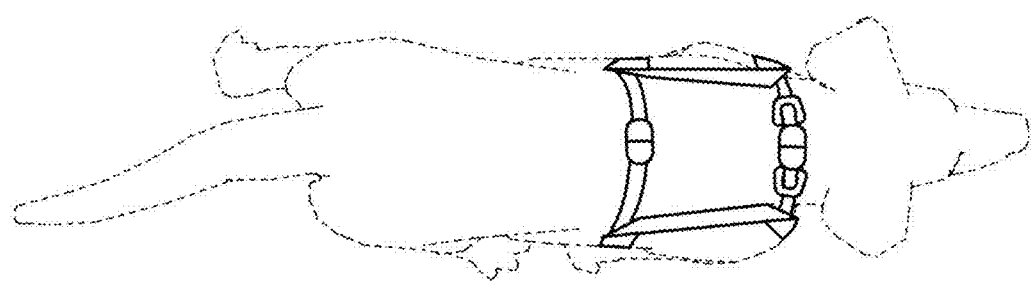
Figure 10A:
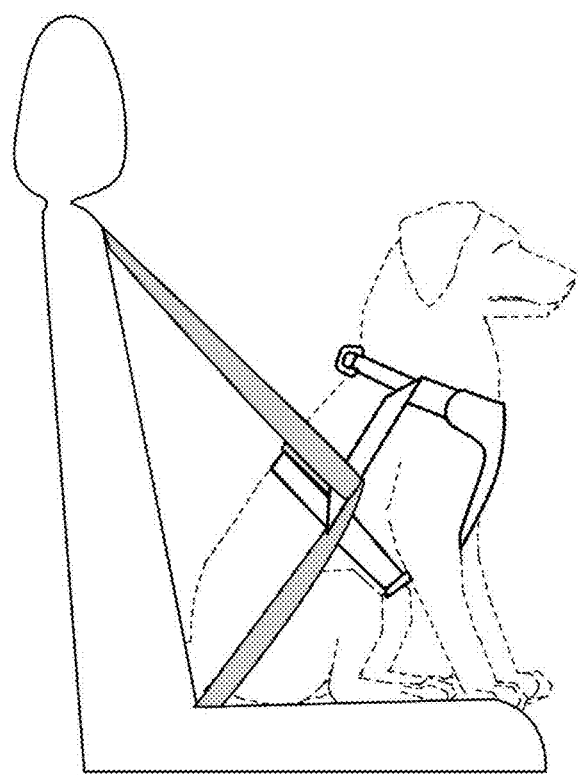
FIG. 10A-C show various views of a dog wearing the harness in a vehicle. Figure C shows the animal retained in the harness during an accident or sudden stop.
Figure 10B:
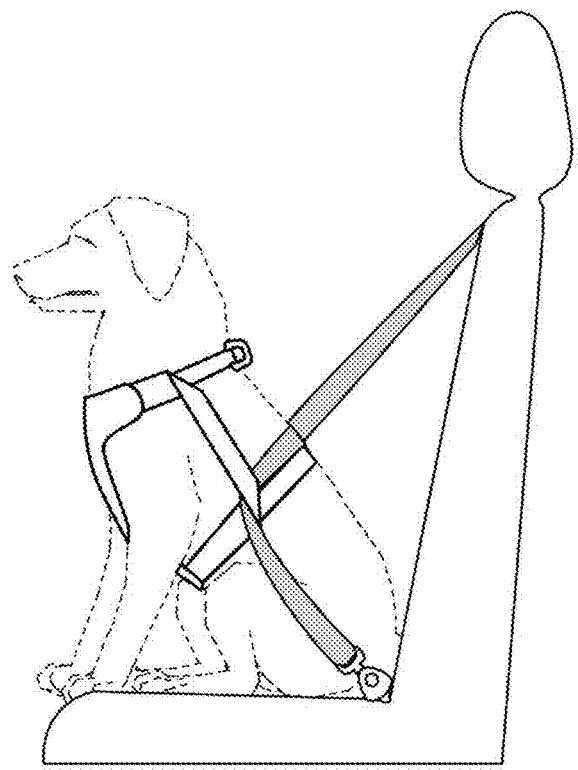
Figure 10C:
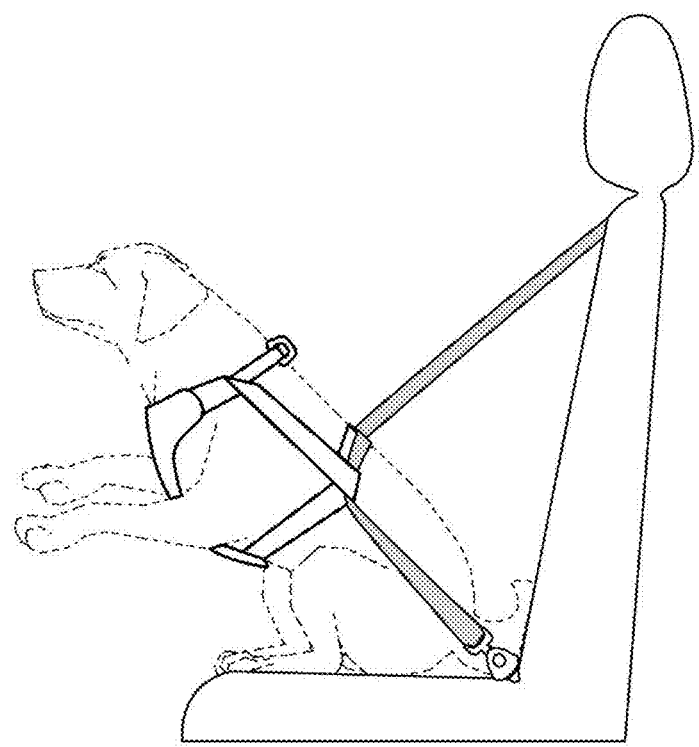

FIG. 8 shows a representation of a harness of the present invention. The actual harness 100 comprises the chest support 114 with chest straps enclosed in a covering and with the "knot" 112 or intertwining of the chest straps clearly visible in grey, the back straps 124 and 126. Each back strap comprises a strap adjustment device 130. The chest support and/or back straps may, optionally, be padded. The connecting straps 116 and 118 extend from the upper to the lower back straps. The upper back strap comprises a buckle 120 and D-rings 128. The D-rings may be used to attach a leash when needed. The lower back strap comprises a buckle 122. Devices for adjusting the length of straps are known by those of ordinary skill in the art and may include the use of two "D-rings" through which the strap is threaded and metal or plastic friction devices though which the strap is threaded (see, for example, U.S. Pat. Nos. 3,760,466 and 4,762,369, which are incorporated herein by reference). In brief, any properly sized, device known by one of ordinary skill in the art that exerts enough friction to prevent the straps from sliding when in use but also allows for easy adjustment as desired is suitable for use with the present invention.

What is claimed is:

1. A vehicle harness for an animal, the harness comprising upper and lower back straps and a chest piece and said chest piece comprising two chest straps, said chest straps being intertwined with each other at one position at the chest and wherein the chest straps are essentially parallel from said intertwining to said lower back straps.

2. The harness of claim 1, wherein the upper back strap being attached to said chest piece at the upper, opposite outside corners of the chest piece and the lower back strap being attached to said chest piece at the lower, opposite outside corners of the chest piece, the upper and lower back straps being integral with connecting straps.

3. The harness of claim 2, wherein the length of one or more back straps comprise or are proximal to strap length adjustment devices.

4. The harness of claim 2, wherein each of said upper and lower back straps comprise or are proximal to a reversibly connectable connecting device comprising two sections, the sections reversibly connectable to each other.

5. The harness of claim 2, wherein said harness also comprises an attachment point for a leash and wherein said attachment point is located proximal to on the upper back strap and comprises at least two rings, each ring located on opposite sides of a connecting device.

6. The harness of claim 2, wherein said harness is securable by a vehicle seat belt said seat belt inserted under the connecting straps and secured to a seat belt clasp.

7. The harness of claim 2, wherein one or more of said chest piece and straps are padded.

8. The harness of claim 5, wherein said connecting device is selected from a group consisting of buckles, clasps, snaps, snap buckles, hooks and loop fastener, hooks and buttons.

9. The harness of claim 2, wherein said connecting straps comprise a left and a right connecting strap.

10. The harness of claim 9, wherein each connector strap has a top and bottom end, the top end of the right connector strap connecting to the right portion of the upper back strap and the lower end of the right connector strap connecting to the right portion of the lower back strap; the top end of the left connector strap connecting to the left portion of the upper back strap and the lower end of the left connector strap connecting to the left portion of the lower back strap.

11. The harness of claim 2, wherein said chest straps, back straps and connecting straps are fashioned from a continuous strap.

12. The harness of claim 2, wherein said chest straps, back straps and connecting straps are fashioned from one piece or comprises two or more pieces connected serially.

13. The harness of claim 1, wherein said harness also comprises an attachment point for a leash.

14. The harness of claim 1, wherein said harness is securable by a seat belt in a vehicle.

15. The harness of claim 1, wherein said animal is a dog.

* * * * *